Nov. 12, 1963   E. H. HENDRIKS   3,110,081
MANUFACTURE OF THERMIONIC BODIES
Filed Jan. 12, 1960   5 Sheets-Sheet 4

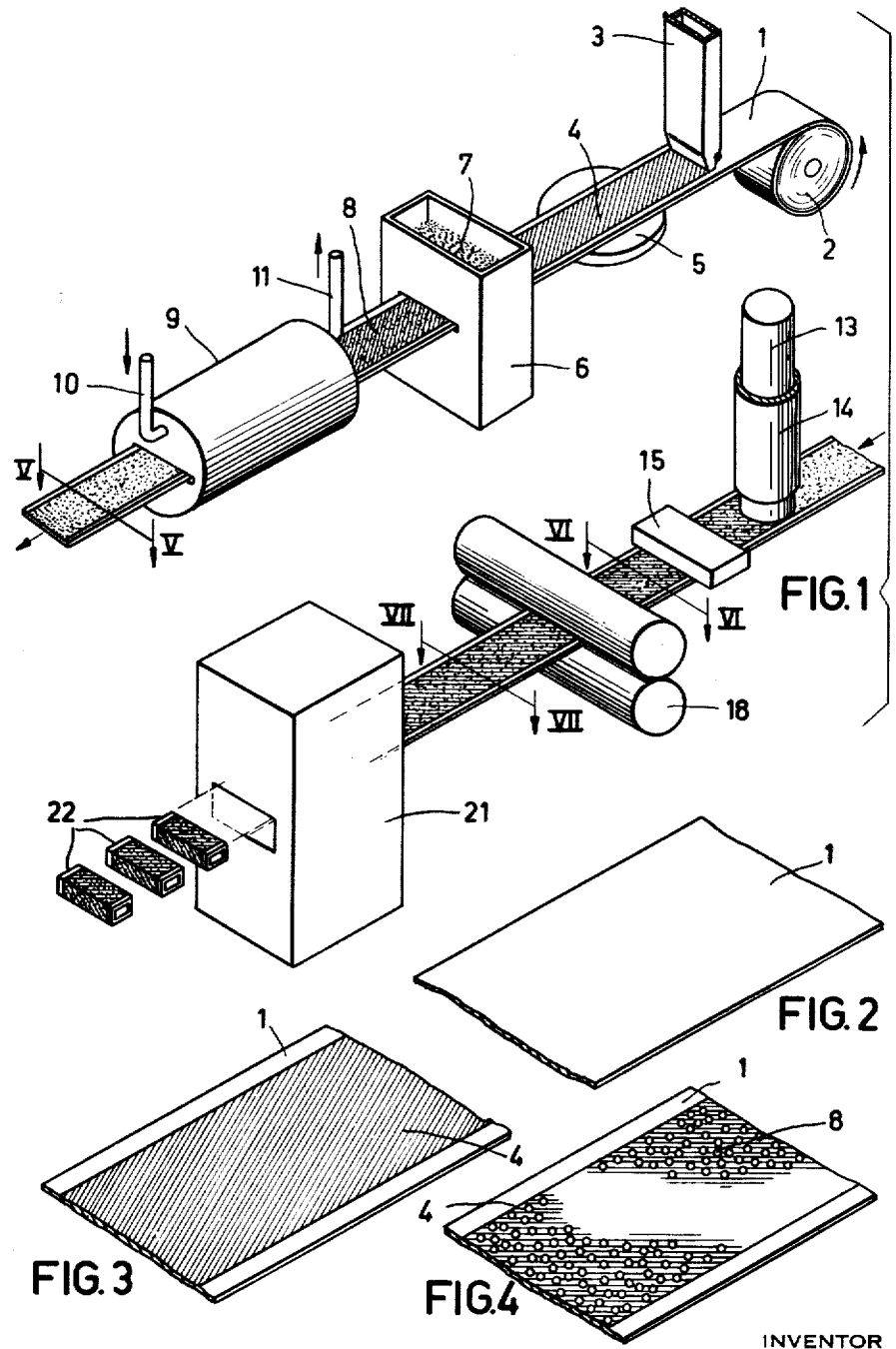

INVENTOR
E.H. HENDRIKS
BY
AGENT

Nov. 12, 1963   E. H. HENDRIKS   3,110,081
MANUFACTURE OF THERMIONIC BODIES
Filed Jan. 12, 1960   5 Sheets-Sheet 5

INVENTOR
E.H. HENDRIKS
BY
AGENT

United States Patent Office 3,110,081
Patented Nov. 12, 1963

3,110,081
MANUFACTURE OF THERMIONIC BODIES
Everardus Hendricus Hendriks, Wallington, England, assignor to North American Philips Company, Inc., New York, N.Y., a corporation of Delaware
Filed Jan. 12, 1960, Ser. No. 2,030
Claims priority, application Great Britain July 13, 1959
3 Claims. (Cl. 29—25.17)

This invention relates to the manufacture of thermionic cathodes and more particularly to cathodes having a coating of a double or triple alkaline-earth metal carbonate on a nickel or nickel-alloy support.

Various techniques are at present employed for applying a carbonate coating to a metallic cathode support. These include the spraying, painting, printing and cataphoretic coating of the support with a suspension of the carbonate in a solution of a binder such as nitrocellulose. These methods have disadvantages in that the emissive coatings obtained lack smoothness, adhesion to the support, compactness, thermal and electrical conduction, have poor resistance to electron and ion bombardment and are of uneven thickness. Attempts have been made in the past to mitigate some of these disadvantages by incorporating metal powder such as nickel in the suspension but difficulties are encountered due to the greater density of the metal particles which limits the amount that can be incorporated and it is also difficult to obtain reproducible results which is important in mass production methods.

To improve the adhesion of the carbonate coating to the metal support various proposals have been made including the roughening of the support by sintering thereto a layer of metal powder. In a known method a continuous layer several particles thick is first sintered onto the support and the emissive coating then applied on top of the particle layer. This method results in cathodes still possessing many of the disadvantages given above but further has the disadvantage that the emissive coating is now no longer in contact with the cathode support which contains the reducing agents necessary for the reduction of the alkaline-earth metal oxide (obtained by decomposition of the carbonate) essential for satisfactory electron emission from the cathode.

It is an object of the invention to provide a new method of manufacturing thermionic cathodes possessing improved mechanical and electrical properties.

According to the present invention there is provided a method of manufacturing a thermionic cathode having a coating of a double or triple alkaline-earth metal carbonate on a nickel or nickel alloy support, which method includes the steps of forming on the support a layer of closely spaced nickel-particles of substantially uniform size, which layer is one significant particle thick; preliminarily attaching the particles to the support by sintering; applying the carbonate in the interstices between particles and removing any excess; and applying pressure to the carbonate and nickel-particle layer sufficient to cold-weld the nickel-particles to the support and to deform the particles so that the compacted carbonate is retained in re-entrant cavities between the deformed nickel-particles.

The statement that the layer of nickel-particles will be one significant particle thick is to be understood to refer, herein, to those particles contributing to the invention, which will be of substantially uniform size. A few particles, too small to be compressed and deformed and therefore not significant, may also be present but they will have no practical effect on the method or on the result achieved. The mean diameter of the significant particles is preferably between 5 and 20 microns.

The support on which the layer of nickel-particles is formed may be shaped in the form of the final cathode but in a preferred embodiment of the invention, particularly suitable for the mass production of thermionic cathodes, the support is in the form of a strip which is not finally shaped until after the carbonate and nickel-particle layer has been compressed.

When manufacturing cathodes in accordance with the present invention it is sometimes necessary to perform some further drawing or shaping operation on an uncoated part of the nickel or nickel alloy support subsequent to said step of applying pressure to the carbonate and nickel-particle layer. If pressure is applied to the whole of the carbonate and nickel-particle layer this step will tend to harden the whole of the nickel or nickel alloy support and the further mechanical treatment will be made difficult.

In a particular form of the invention this disadvantage is mitigated or obviated by the carbonate and nickel-particle layer being formed on the nickel or nickel alloy support over an area equal to the area of the emissive surface of the cathode to be produced and pressure being applied to the nickel or nickel alloy support so as to compress only said carbonate and nickel-particle layer. Alternatively, the carbonate and nickel-particle layer may be formed on the strip over an area greater than the area of the emissive surface of the cathode to be produced and pressure may be applied to the nickel or nickel alloy support to compress only an area of the carbonate and nickel-particle layer equal to the area of the emissive surface of the cathode to be produced.

The cathode produced by the method according to the invention has a very smooth surface and can be made to accurate dimensions permitting closer spacing with other electrodes when incorporated in an electron discharge device.

The carbonate coating also possesses exceptional mechanical strength and when coating is first formed on a support in the form of a strip, the latter can be deformed, for example in a lock-seaming machine, without damage to the coating.

A further advantage of the cathode produced in accordance with the invention is that it can withstand back-bombardment due to the presence of metallic areas in the surface of the cathode.

An even further advantage is that it permits cathodes to be produced in which the interface resistance, that is the resistive layer that is generally produced between the emissive coating and the support during the life of the cathode, is much reduced even when triple carbonate is used and for which this interface resistance is a problem with conventional oxide-cathodes.

Although the carbonate may be applied in the interstices between the nickel-particles in the form of a suspension in a binder, it is preferred to apply the carbonate without a binder present.

Three embodiments of the invention will now be described, by way of example, with reference to the diagrammatic drawings, in which:

FIGURE 1 is a perspective view of one embodiment of the method according to the invention in which thermionic cathodes are manufactured by applying emissive material to a metal strip which is subsequently shaped into cathodes;

FIGURES 2 to 4 show on a larger scale perspective views of the metal strip in various stages of the method shown in FIGURE 1;

Figure 5:
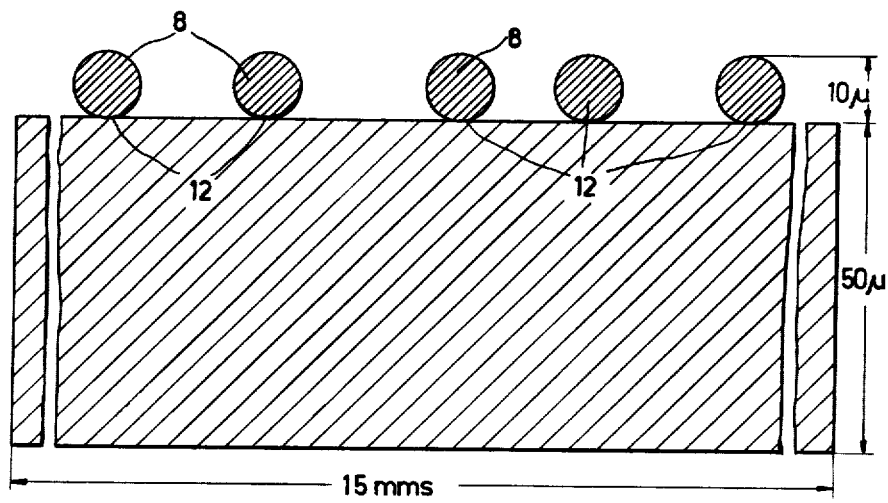
FIGURES 5 to 7 are cross-sectional views of the strip along the lines V—V, VI—VI and VII—VII; respectively, of FIGURE 1.

Referring to FIGURE 1, reference numeral 1 indicates a nickel strip wound on a reel 2, the width of the strip corresponding to the length of the final cathode. The strip 1 is made of nickel or nickel alloy having a composition usually employed in cathode manufacture and, for example, may be nickel known as "O"-nickel. Such nickel or nickel alloy contains reducing agents such as magnesium and aluminum which in the final stages of manufacture of the cathode act to reduce alkaline-earth oxides to free metal.

The strip 1 passes under a pen 3 which paints on the strip 1 a thin film of adhesive 4, the film extending over the major part of the width of the strip and determining the dimensions of the final coating on the cathode to be produced (see FIGURE 3). The adhesive film 4 is then dried by a heating plate 5 near the underside of the strip 1. After the film 4 has been dried the strip passes through a magnetic container 6 of carbonyl nickel powder particles 7 of substantially uniform size (10 microns) with the result that a layer of closely spaced particles 8 is formed on the strip adhering to the film 4, the average spacing between the particles being about 1 to 2 particle diameters. The adhesive applied by the pen 3 is chosen in such manner the particles themselves are not wetted sufficiently to cause other particles to stick to them with the result that a layer which is only one particle thick is produced. The adhesive may consist of a solution of 45 grams of nitrocellulose in 1 litre of butyl acetate, 0.5 litre of acetone and 50 mls. of triethylene glycol di-(2-ethyl butyrate) available commercially under the trade name Flexol. The nickel-particles 8 adhering to the dry adhesive film 4 on the strip 1 are also shown in FIGURE 4 in which, of course, the particles 8 are shown on a disproportionately large scale. After the strip 1 leaves the container 6 it is subjected to a gentle tapping and brushing action from underneath to loosen excessive nickel powder particles which are re-attracted by the magnetic field of the container 6 ensuring that a monolayer of particles is formed on the strip. The nickel-particles 8 are now preliminarily attached to the strip 1 by heating the latter in an oven 9 at 1100° C. in an atmosphere of a reducing gas mixture of 90% hydrogen and 10% nitrogen, inlet and outlet pipes for the gas mixture being indicated at 10 and 11, respectively. Before the strip 1 leaves the oven 9 the reducing gas also acts to cool the strip to prevent oxidation. During this sintering process the adhesive is removed completely and the strip rendered clean and thus ready for the application of alkaline-earth metal carbonate in the next stage.

A transverse cross-sectional view of the strip leaving the oven 9 along the lines V—V is shown in FIGURE 5. This shows the particles 8 sintered to the strip 1 at the points of contact 12. Although the particles 8 are distributed over the strip 1 in a random manner, those appearing in FIGURE 5 and the next two figures have been shown extending in line across the strip merely to assist in the understanding of the invention and in the interests of clarity. Typical dimensions for the strip 1 and particles 8 are indicated in the figure.

In the next stage of the manufacture double or preferably triple alkaline-earth carbonate with, for example, a Ba:Sr:Ca ratio of 47:43:10 in the dry state and without any binder is applied to the strip in the interstices between the particles 8. This is conveniently done by soft-sintering the carbonate, which should be moderately adhering (such as is precipitated by sodium carbonate), at, for example, 600° C. for 5 minutes into soft chalk-like sticks 13 in cartridges 14 (shown in part only) and holding the sticks 13 against the particle layer 8 on the strip 1 with slight pressure to ensure preliminary anchorage of the carbonate powder with the aid of the keying effect due to the shape of the particles. If necessary the sticks 13 may be rubbed over the strip 1 to ensure a more uniform application of carbonate to the particle layer. The surface of the strip is then lightly rubbed by a soft device 15 to spread the carbonate uniformly over the particle layer 8 and to ensure the application of carbonate in all the spaces between the particles. The device 15 also serves to wipe off any excess carbonate above the level of the nickel-particles 8. In practice the sealed and slightly corrugated surface of a piece of sponge latex rubber has been found very suitable for spreading and wiping off the carbonate. The removal of the excess carbonate is facilitated by a jet of air directed onto the strip around the wiping and rubbing device 15.

Figure 6:
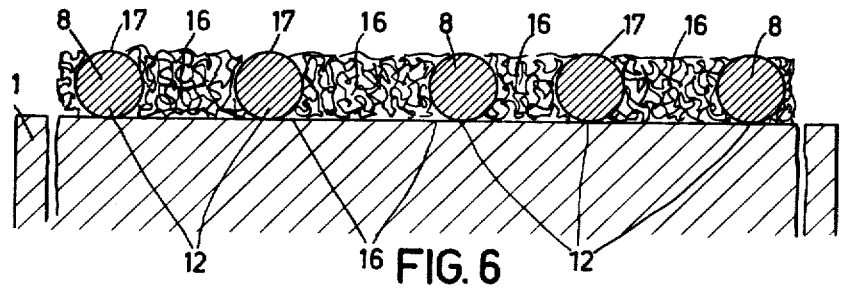

The cross-section of the strip after passing the device 15 along the line VI—VI of FIGURE 1 is shown in FIGURE 6 showing alkaline carbonate 16 relatively loosely packed in the spaces between the particles 8 but leaving the tops of the particles exposed at 17. In the application of the carbonate 16 in the spaces between the particles 8 there is preliminary anchorage of the carbonate by reason of the generally spherical shape of the particles but due to the fact that only light pressure has been employed in this application the carbonate does not extend at this stage into the extremities 16' of the re-entrant cavities between the particles 8. It may be mentioned that even at this stage the weight of carbonate per unit area of the strip is as much as half that of conventional sprayed carbonate coatings of 50 micron thickness.

Figure 7:
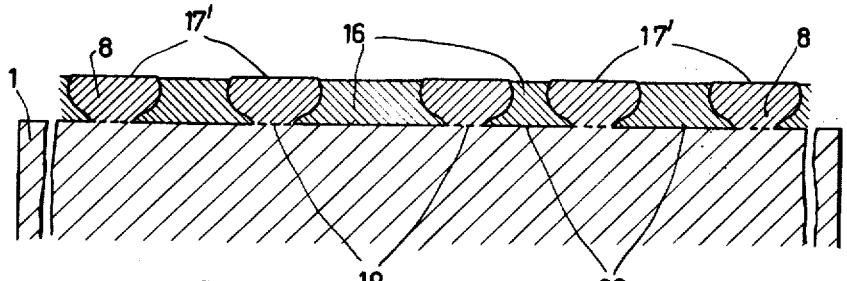

The strip 1 is then passed (preferably under stress) through a steel roller 18 which compresses the strip at a pressure of about 60 tons/sq. in., i.e., at a pressure much greater than the pressure flow limit of nickel, to produce a smooth metallic finish to the strip. The effect of the compression is illustrated in FIGURE 7. Due to the high pressure employed, the particles 8 becomes cold-welded to the strip 1 as indicated by broken lines 19 and also the upper surface of the particles become flattened as shown at 17' and the particles deformed making the cavities between the particles more re-entrant. It has been noticed that after the compression the flattened particles slightly resile as shown in FIGURE 7. The carbonate is also highly compacted and now fills entirely the cavities between particles 8 in which it is thereby firmly locked. Also during the compression contact between the carbonate 16 and the surface areas 20 of the strip 1 between the nickel-particles 8 is made intimate. A further effect of the compression is to work-harden the strip and particle layer which are previously softened by the sintering operation. The carbonate and nickel-particle layer is compressed to a thickness of about six and a half microns.

The strip now passes into a lock-seaming machine schematically indicated at 21 which divides up and bends the coated strip to produce rectangular cathodes 22 as shown or cylindrical cathodes, as desired.

Figure 8:
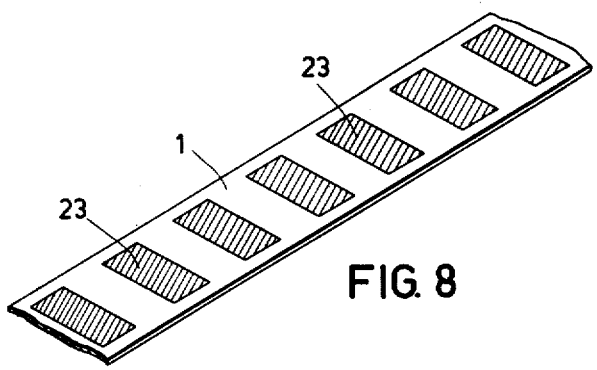
FIGURES 8 to 10 illustrate a modification of the method shown in FIGURES 1 to 7.
Figure 9:
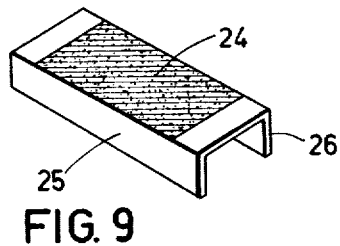
Figure 10:
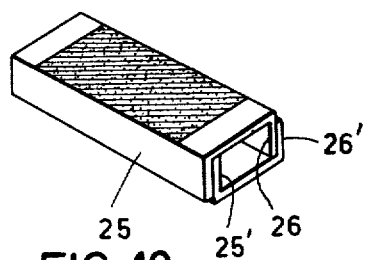

The adhesive film 4 applied to the strip 1 by means of pen 3 need not be continuous as in FIGURE 1 but may be applied in short length 23 as shown in FIGURE 8. The treatment of the strip may be the same as that shown in FIGURE 1 except that after compression by the roller 18 the strip may be cut up into short lengths and deformed into U-shaped pieces as shown in FIGURE 9, the carbonate-particle layer extending across the upper face 24 and absent from the side faces 25 and 26 of the bent strip length. Two of such shaped strip lengths are then held together as shown in FIGURE 10 and welded along their contacting side faces 25, 25' and 26, 26' to form a rectangular cathode.

Figure 11:
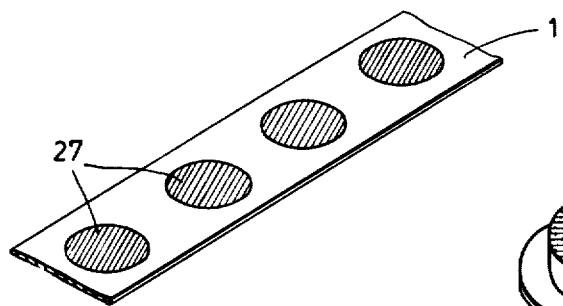
FIGURES 11 and 12 illustrate a method similar to that of FIGURES 8 to 10 but for the manufacture of a differently shaped cathode.
Figure 12:
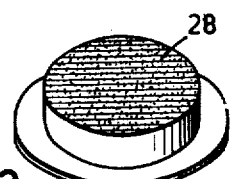

FIGURES 11 and 12 illustrate the manufacture of a further shape of cathode particularly suitable for use in cathode-ray tubes. In this case the adhesive is applied to the strip 1 (which is in this case narrow) in circular patches 27 and after the later step of compressing the carbonate and nickel-particle layer by means of the roller 18, cathodes of the "top-hat" shape shown in FIGURE 12 are formed from discs cut from the strip by drawing, the upper surface 28 being the emissive surface of the cathode.

Figure 13:
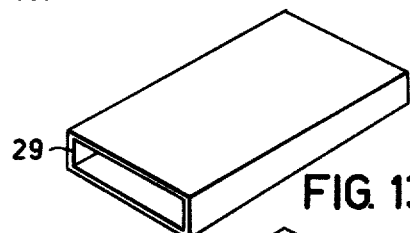
FIGURES 13 to 16 illustrate a second embodiment of the invention in which the emissive coating is applied to a cathode support after the latter has been shaped.
Figure 14:
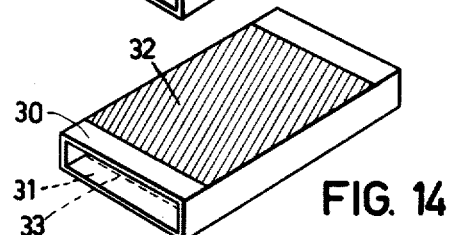
Figure 15:
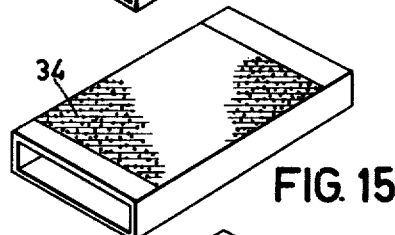

FIGURES 13 to 16 illustrate a further embodiment of the invention in which a cathode support of nickel or nickel alloy is first shaped into the final form of the cathode before the carbonate and nickel-particle coating is applied. FIGURE 13 shows a rectangular cathode support 29 obtained by forming drawn tubing in the usual manner. Onto the upper and lower faces 30 and 31 of this cathode support 29 is sprayed or painted thin films 32 and 33 of adhesive (see FIGURE 14). A number of these supports are then tumbled in a slightly excess quantity of powder of nickel-particles of substantially uniform size so that onto the adhesive films on the support an adhering layer of closely spaced particles, one significant particle thick, is produced. Alternatively, the cathode supports may be kept in racks for the spraying or painting and brought into light contact with the nickel-particles. The particles are then sintered onto the cathode supports at 1000° C. at which temperature the adhesive is completely removed. Double or triple alkaline-earth carbonate in the dry state and without binder is then applied in the interstices between the nickel-particles by tumbling the cathodes in a slight excess of the carbonate or are treated individually by lightly rubbing the powder into the interstices. In each case any excess carbonate is removed. The carbonate and nickel-particle layers are indicated at 34 in FIGURE 15.

Figure 16:
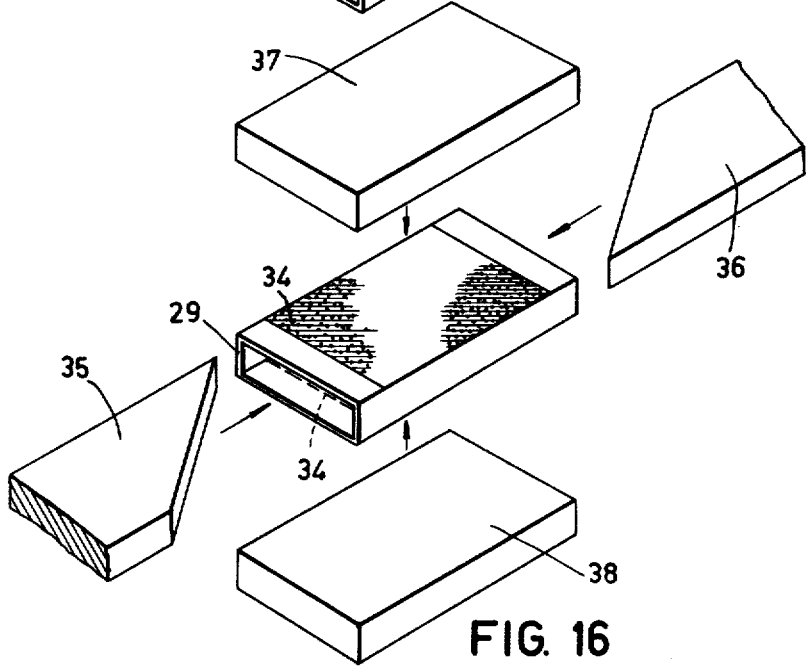
Figure 17:
FIGURES 17 to 22 illustrate a method similar to that shown in FIGURES 13 to 16 but for the manufacture of a differently shaped cathode.
Figure 21:

The compression of the carbonate and nickel-particle layers 34 is illustrated diagrammatically in FIGURE 16. Two wedge-shaped mandrel parts 35 and 36 are first inserted into the cathode which is then compressed between polished steel plates 37 and 38 so that each layer on the cathode is compressed at about 60 tons/sq. in. The mandrel parts are then removed.

Figure 18:
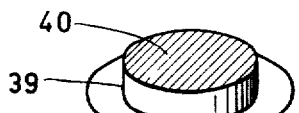
Figure 19:
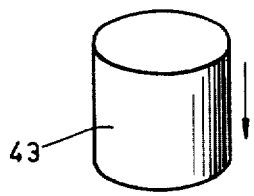
Figure 22:
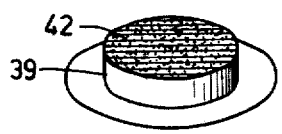
Figure 20:
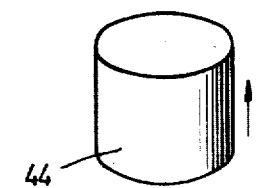

FIGURES 17 to 22 illustrate a similar method of manufacturing the so-called "top-hat" cathodes. The cathode support 39 is first formed by, for example, pressing from a nickel sheet (FIGURE 17) and a thin film of adhesive 40 painted or sprayed onto the upper flat surface (FIGURE 18). A nickel-particle layer 41 (FIGURE 19) is then produced as before by, for example, tumbling a number of the cathodes in a quantity of nickel powder. FIGURE 20 shows the adhesive burnt away after heating at 1000° C. to sinter the particles 41 to the cathode support 39. Carbonate in the dry state and without binder is then applied in the interstices between the particles (FIGURE 21) and finally the carbonate and nickel-particle layer 42 is compressed between steel parts 43 and 44 (FIGURE 22) to cold-weld the particles to the cathodes and deform the particles to produce re-entrant cavities in which the carbonate in a highly compacted state is retained as has been described above.

Of the two alternatives described above for compressing only the required emissive area, the second is preferred, i.e., it is preferred to produce the carbonate and nickel-particle layer on the strip over an area greater than the area of the emissive surface to be produced, only areas of said layer corresponding to the emissive surfaces of the cathodes subsequently being compressed. This second alternative avoids the difficulty, experienced in a continuous process using the other alternative of producing the carbonate and nickel-particle layer, of printing in the initial stage of the process, small areas of adhesive of the required accurate dimensions on a moving metal strip. Since in the preferred alternative the uncompressed carbonate of the regions of the carbonate and nickel-particle coating surrounding the compressed areas may give rise to difficulty in the subsequent shaping operation it is preferably removed and this may, for example, be effected by brushing the strip or by means of a blast of air.

Figure 23:
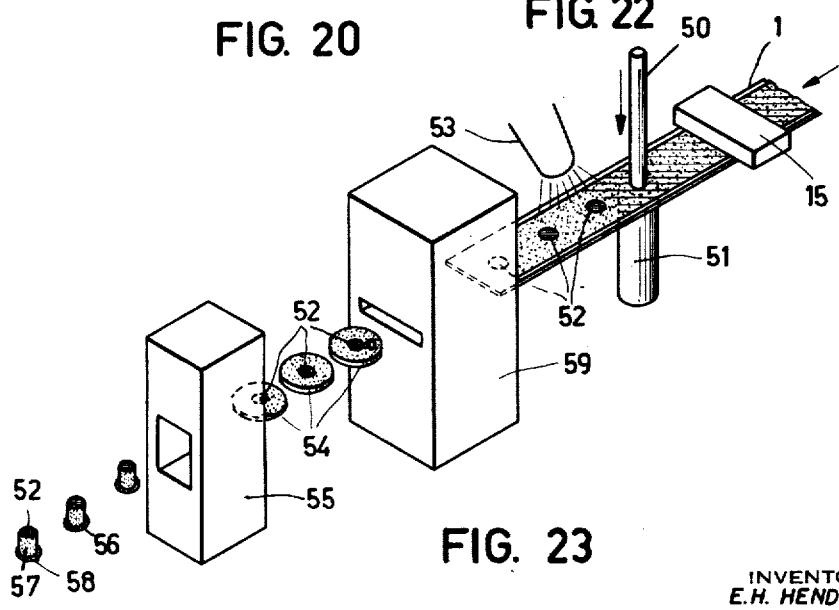
FIGURE 23 illustrates a method of manufacturing a cathode similar to that shown in FIGURES 17 to 22 by the method in which only the required emissive surface is compressed.

An embodiment illustrating this form of the invention will now be described with reference to the drawing referred to as FIGURE 23, which is a modification of the method described and illustrated in FIGURES 1 to 7 and which is for the production of cathode-ray tube cathodes of the so-called "top-hat" shape.

After the alkaline-earth carbonate material has been applied to the nickel strip 1 and distributed uniformly in the spaces between the nickel-particles sintered to the strip by means of the device 15 the strip is not passed through a compression roller (as in FIGURE 1) but is passed between a punch 50 and a pad or anvil 51. The punch 50 has a flat circular highly polished end face which is of the same diameter as that of the emissive surface of the cathode to be produced, for example 2 mms., and the anvil 51 also has a flat circular end face although of greater diameter than that of the punch 50. At a predetermined instant the strip is stopped in the region of the punch (the strip before the punch continuing its uninterrupted travel forward) and the punch operated to compress an area of the carbonate and nickel-particle layer equal to the area of the emissive surface of the desired cathode at a pressure of about 60 tons per square inch to effect the cold-welding of the particles to the strip 1. The anvil 51 is preferably resiliently mounted, for example by means of a spring, to permit control over the compression. The strip is then moved on, the slack in the strip immediately preceding the punch being taken up, and stopped again and a further compression effected and these operations are repeated to give a row of compressed areas 52 each equal to the area of the emissive surface of the cathodes to be produced. Following the punch 50 the strip is subjected to a blast of air, for example 70 lbs. per square inch pressure, from a jet 53 in order to remove the carbonate material (indicated in the drawing by the horizontal shading lines) loosely packed between the uncompressed nickel-particles in the regions surrounding the compressed areas 52. The strip is then passed into a cutting device 59 which cuts discs 54 from the strip of, for example, 6 mms. diameter concentric with the compressed carbonate and nickel-particle areas 52 on the discs.

The discs are then shaped into the cathode in the cup-drawing apparatus represented at 55 in a manner similar to the conventional processes for producing cathode supports of so-called "top-hat" shape. This drawing process involves several stages and results in cathodes 56. Typical dimensions of cathodes which may be produced are:

diameter of emissive surface 52=2 mms.
depth of cylindrical portion 57=2 mms.
external diameter of flange 58=3 mms.

Since the region surrounding the compressed carbonate and nickel-particle area retains its very soft condition resulting from the annealing during the sintering operation earlier in the manufacture, the strip at this region is sufficiently ductile to allow the drawing operations to be readily effected and permit cathodes having a small diameter to depth ratio, for example of 1:1 as in the typical case given above, to be produced.

The alkaline-earth carbonate is removed by the air blast to reduce friction between the disc and the drawing tools during the shaping of the cathode.

Cathodes in other types of electron discharge apparatus can also be made by the method described above such as cathodes for disc-sealed tubes, magnetrons and travelling-wave tubes.

Of course this method of compressing only the required emissive area need not be confined to the case of the "top-hat" cathode, but may also be utilised in cases where the shape of the emissive area has to be of a more complex form.

One example of this is the case in which a space current is required in the shape of a hollow beam. In such a case the cathode would have to be an emissive surface of annular shape. Another example of this is the case in which it is required to omit parts of the emissive coating of a cathode which would lie opposite certain grid wires when mounted in a discharge tube.

In such cases an advantage gained from the invention lies in that it is usually simpler to use a specially shaped punch than to use known techniques of painting or masked spraying.

Each of the cathodes obtained by the methods described above is subsequently incorporated in an electron discharge tube and the carbonate decomposed and the cathode activated in the usual manner.

As has been mentioned above, the support for the cathode coating is nickel or a nickel alloy as normally employed. Pure nickel is not employed since the support must contain reducing agents so that during the activation of the cathode the alkaline-earth oxides, obtained by the decomposition of the carbonates, can be reduced to produce free barium essential for electron emission. However, the nickel-particles applied to the support may consist of pure nickel. This is not essential and they may have a composition similar to that of the cathode support but will not contribute to the reduction of the alkaline-earth oxide during activation since reducing metals present in the particles are oxidized by the carbon dioxide released during decomposition of the carbonate and are rendered inactive.

It is important that the significant particles be of substantially uniform size to result in an emissive coating of controlled and uniform thickness. They do not have to be identical in size which in practice would be very difficult to achieve but, for example, when the significant particles have a mean diameter of 10 microns they should not vary by more than one or two microns from this means value. In the drawings and in particular in FIGURES 5 and 6, the particles 8 have all been shown as single spheres for convenience but some of the significant particles may in fact be agglomerates of smaller particles.

Due to the use of substantially uniformly sized particles the emissive surface of the cathode is made smooth by the compression and furthermore the emissive coating can be made to accurate dimensions by the choice of particles of a predetermined size. Thus there is very accurate control over the thickness of the emissive layer of the cathode. This means that cathodes made in accordance with the invention can be more closely spaced to other electrodes in values and in particular in cathode-ray tubes.

Another feature of cathode coatings made in accordance with the invention is that they possess great mechanical strength. Conventional coatings produced by, for example, spraying are very fragile and easily damaged and furthermore when the cathode is bent the coating flakes off. This is in great contradistinction to the coatings produced in accordance with the invention. The latter are very strong and can be rubbed without detrimentally affecting the emissive layer and furthermore can be bent as is the coated strip in FIGURE 1 without damage to the emissive coating.

The robustness of the cathode coating as well as being significant in the fabrication of the cathode, plays an important part in the use of the cathode for certain applications, namely those in which the cathode may be subject to sputtering or sparking or both. This latter effect is prominent in high efficiency vacuum rectifier valves and valves operated under certain pulse and high frequency conditions. Cathodes made in accordance with the invention enable oxide-cathode vacuum rectifiers to be produced which are more efficient than has hitherto been possible. This is principally due to the fact that in such rectifiers the anode and cathode can be more closely spaced without the effects of sputtering occurring, which effects readily occur when conventional oxide cathodes are situated near the anode.

Another important feature of cathodes produced in accordance with the invention is the considerable reduction and near absence of the interface resistance. During the use of many valves with oxide cathodes the emission of the cathode diminishes due to a resistive layer that forms between the oxide layer and the metal of the cathode support and may even be of the order of 100–200 ohms. The formation of the interface resistance is prominent when the triple carbonate (Ba-Sr-Ca-carbonate) is used to coat a cathode support of so-called "O"-nickel. However, when these latter components are used in the method of invention the interface resistance is reduced to a negligible value when the nickel-particles are made of pure nickel. This improvement may be due to the considerable surface area of pure nickel which does not give rise to interface resistance or due to the greater contact area between the oxide coating and the cathode support arising from the substantial compression of the carbonate during manufacture of the cathode or due to the greater metal-oxide contact area may be due to a combination of these features.

The reduction of interface resistance has an influence not only on the use of valves but also on the manufacture of valves and in particular in the manufacture of receiving valves for entertainment purposes. This arises because in the mass production of valves the triple alkaline-earth carbonate is preferred because cathodes so produced are much easier to activate as compared with those prepared with double carbonate but as remarked above triple carbonate readily gives rise to interface resistance problems. However, cathodes produced in accordance with the invention are able to take advantage of the simpler activation properties of triple carbonate without the normal difficulty of interface resistance arising.

Although the layer of nickel-particles does reduce the area of the cathode support in contact with the emissive layer the loss of contact area is compensated by the compression of the carbonate and nickel-particle layer which results in very intimate contact between the carbonate and the support. Experiments show that with the pressures involved the carbonate is compressed to substantially its maximum density.

An important feature of cathode made in accordance with the invention is that the nickel-particles are cold-welded to the support. After the sintering stage there is effectively only point-contact between the particles and the support but by subsequently compressing them at very high pressures so that cold-welding takes place intimate contact over a much greater area is obtained. This contributes to the mechanical strength of the cathode and also gives good thermal and electrical conductivity from the surface of the cathode to the support. Thus the particles which are now effectively continuations of the support and which are dispersed throughout the cathode coating reduce the possibility of "hot-spots" by rapid conduction of heat from hotter areas of the cathode through the particles.

As has been remarked earlier the compression highly compacts the carbonate and this, it is believed, reduces the shrinkage of the carbonate during its decomposition to oixde.

In the described method of carrying out the invention the carbonate is applied in the interstices between the nickel-particles on the support in the dry state and without binder present.

The described method of carrying out the invention by applying the carbonate in the dry state has the advantage that it enables metal loaded cathodes to be produced without encountering the difficulties associated with the wet binder techniques described earlier. Thus the metal loading in a finely divided state can readily be dispersed uniformly throughout the dry carbonate and furthermore the amount of metal loading can be made much greater than has hitherto been possible. There is also greater choise of metals which may now be conveniently incorporated, for example, the high density metal tungsten can be included.

Finally, the method of the invention and in particular the embodiments described above with reference to FIGURES 1 to 12 and to FIGURE 23 in which the carbonate and nickel-particle coating is first applied to a support in the form of a strip which is subsequently shaped into the final cathode, provides an easy and cheap method of mass producing thermionic cathodes.

What is claimed is:

1. A method of manufacturing thermionic cathodes comprising the steps of forming on a nickel-containing support a layer of closely spaced nickel particles of substantially uniform size, said layer being one significant particle thick, attaching the particles to said support by sintering, applying an alkaline earth carbonate in the interstices between said particles, removing any excess alkaline earth carbonate, and applying pressure to cold weld said particles to said support and to compact said carbonate, a portion of said carbonate being retained in reentrant cavities between deformed nickel particles to maintain said compacted carbonate in a fixed relationship with said support.

2. A method according to claim 1 in which said carbonate is applied in the absence of a binder.

3. A method according to claim 1 in which said carbonate is applied in a dry state.

References Cited in the file of this patent

UNITED STATES PATENTS

| | | |
|---|---|---|
| 1,919,984 | Murphy | July 25, 1933 |
| 1,946,603 | Von Wedel | Feb. 13, 1934 |
| 2,422,469 | Coomes | June 17, 1947 |
| 2,543,439 | Coomes et al. | Feb. 27, 1951 |
| 2,916,653 | Marksoud | Dec. 8, 1959 |
| 2,917,811 | Powers | Dec. 22, 1959 |
| 2,945,150 | De Santis et al. | July 12, 1960 |

UNITED STATES PATENT OFFICE
CERTIFICATE OF CORRECTION

Patent No. 3,110,081            November 12, 1963

Everardus Hendricus Hendriks

It is hereby certified that error appears in the above numbered patent requiring correction and that the said Letters Patent should read as corrected below.

In the heading to the printed specification, line 7, for "July 13, 1959" read -- January 22, 1959 --.

Signed and sealed this 5th day of May 1964.

(SEAL)
Attest:
ERNEST W. SWIDER

Attesting Officer

EDWARD J. BRENNER
Commissioner of Patents